United States Patent [19]

Baba

[11] Patent Number: 4,880,591

[45] Date of Patent: Nov. 14, 1989

[54] METHOD FOR MANUFACTURING SPEAKER VIBRATION MEMBER

[75] Inventor: Fumiaki Baba, Amagasaki, Japan

[73] Assignee: Mitsubishi Denki Kabushiki Kaisha, Tokyo, Japan

[21] Appl. No.: 178,009

[22] Filed: Apr. 5, 1988

[51] Int. Cl.⁴ .............................................. B29C 35/00
[52] U.S. Cl. .............................. 264/327; 264/328.12; 264/328.16; 264/328.18
[58] Field of Search ..................... 264/328.12, 328.18, 264/328.16, 327

[56] References Cited

U.S. PATENT DOCUMENTS

| | | | |
|---|---|---|---|
| 3,894,823 | 7/1975 | Hanning | 264/328.12 |
| 3,907,952 | 9/1975 | Cleereman | 264/328.12 |
| 4,404,161 | 9/1983 | Bier | 264/328.16 |
| 4,490,326 | 12/1984 | Beroff et al. | 264/328.16 |
| 4,560,342 | 12/1985 | Ishida et al. | 264/328.12 |
| 4,728,698 | 3/1988 | Isayev et al. | 264/177.13 |

FOREIGN PATENT DOCUMENTS

| | | |
|---|---|---|
| 149296 | 7/1987 | Japan . |
| 202699 | 9/1987 | Japan . |
| 253300 | 11/1987 | Japan . |

Primary Examiner—Jan H. Silbaugh
Assistant Examiner—Allan R. Kuhns
Attorney, Agent, or Firm—Fleit, Jacobson, Cohn, Price, Holman & Stern

[57] ABSTRACT

A speaker vibration member is made by melting materials containing no less than 10% of a thermoplastic liquid crystal polymer and 3 to 40% of fiber or flake filled by weight, allowing the mixture to flow, cooling the mixture, and solidifying it.

7 Claims, 3 Drawing Sheets

FIG.1A
FIG.1B
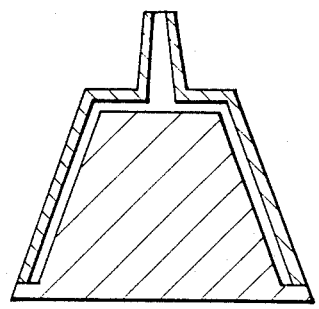
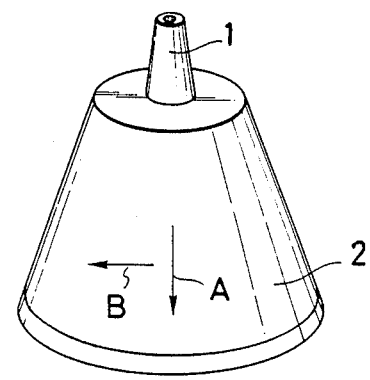

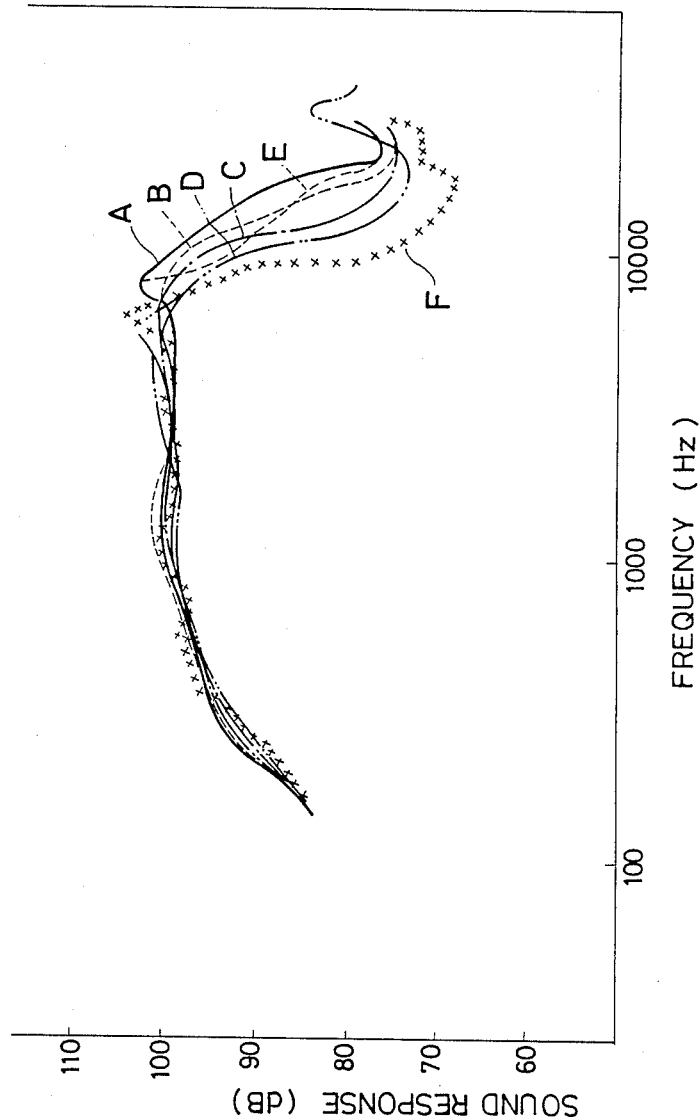

METHOD FOR MANUFACTURING SPEAKER VIBRATION MEMBER

BACKGROUND OF THE INVENTION

This invention relates to a method for manufacturing a speaker vibration member.

Speaker vibration members, which are one of the component elements of loudspeakers, are also known as diaphragms. In order to increase the range of their piston movement, they are required to have a high relative elastic coefficient $E/\rho$ (where $E$=elasticity and $\rho$=density), and in order to provide a smooth response in the high frequency region, they are required to have suitable internal losses.

In the prior art, in order to increase $E/\rho$, carbon fiber was mixed into vibration members containing mainly paper pulp. In recent years, $E/\rho$ has been improved by mixing carbon fiber or mica into plastic materials. To increase internal losses, on the other hand, vibration members have been impregnated with organic paints.

In the above methods where carbon fiber is mixed with paper pulp, there are limitations to the amount of fiber so that in actual practice, it is not possible to expect a great increase in $E/\rho$. In methods where carbon fiber or mica is mixed with plastic, the melt viscosity rises so that a restriction is imposed on the formation of the vibration member. Further, in methods where the vibration member is impregnated with organic paints, although internal losses do increase, $E/\rho$ falls. There have been other attempts to increase $E/\rho$ and obtain a vibration member with suitable internal losses, however it has so far been practically impossible to satisfy both of these requisites simultaneously in an economically viable process.

SUMMARY OF THE INVENTION

An object of this invention is to solve the above problems.

Another object of the invention is to provide a method for manufacturing speaker vibration members which have as high as possible a value of $E/\rho$, together with suitably high internal losses.

According to the invention, there is provided a method for manufacturing a speaker vibration member in a molding process, the method comprising a first step of preparing materials containing no less than 10% by weight of liquid crystal polymer and 3 to 40% by weight of fiber or flake filler, a second step of melting the mixture of the liquid crystal polymer and fiber or flake filler materials, and a third step of cooling and solidifying the melted materials when they flow in a mold which is adjusted at a lower temperature than the solidification temperature of the materials.

In this invention, a fiber or flake filler is added to a liquid crystal polymer. The melt therefore cools and solidifies with an orientation in the direction of resin flow, thereby giving a vibration member with higher elasticity and suitable internal losses.

BRIIEF DESCRIPTION OF DRAWINGS

FIG. 1A is a cross sectional view showing a mold including inner and outer molds.

FIG. 1B is a perspective view, with the outer mold being removed, showing the resin flow in a mold wherein a speaker vibration member is manufactured in one embodiment of the present invention.

FIG. 2 is a diagram showing sound pressure-frequency characteristics of speaker vibration members according to Examples 1 to 5 of the present invention and Comparative Example 1.

DETAILED DESCRIPTION OF THE PREFERRED EMBODIMENT

Figure 3:
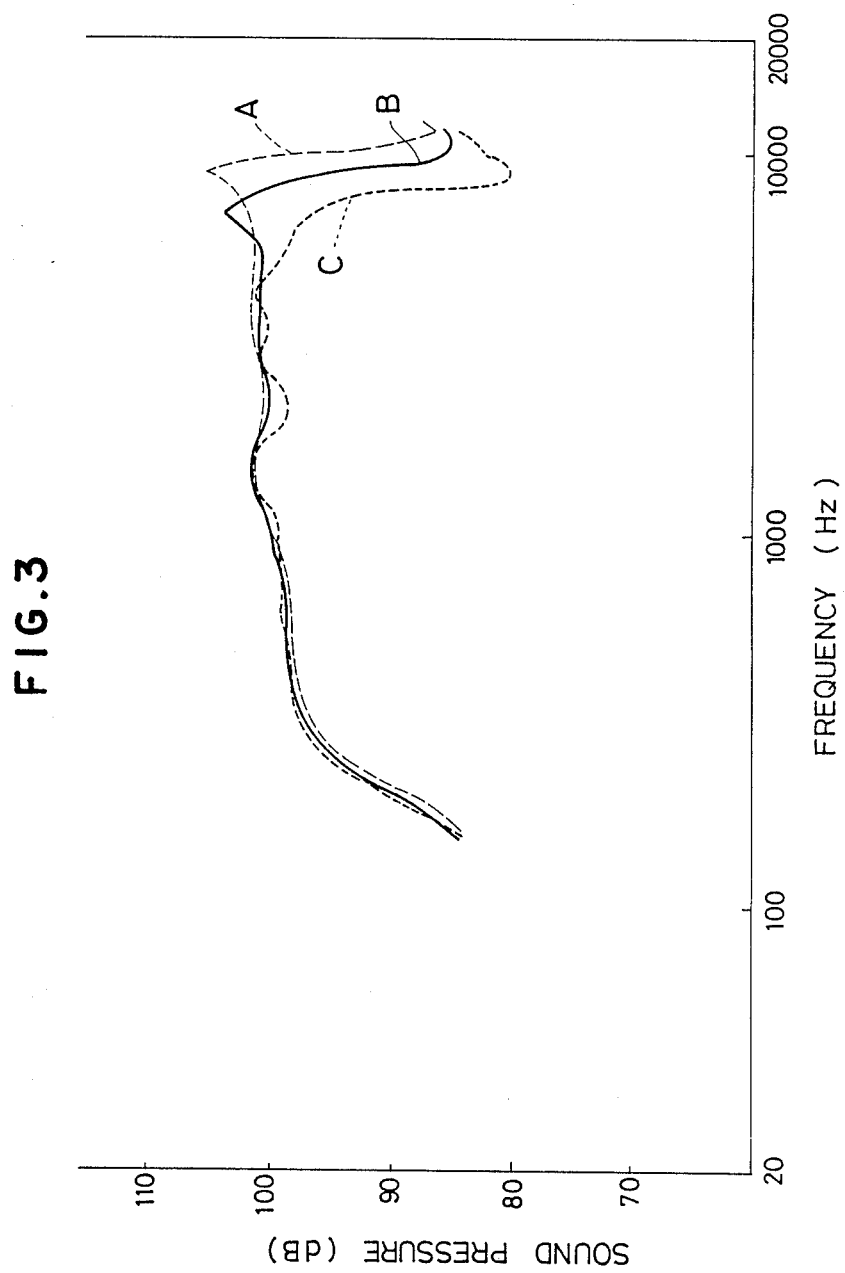
FIG. 3 is a diagram showing sound pressure-frequency characteristics of speaker vibration members according to Examples 6 and 7 of the present invention and Comparative Example 3.

It is known that when polymers are oriented, their elastic coefficient and tensile strength increase. It is known, moreover, that at the time of molding thermoplastic resins, orientation of the polymer takes place. In prior molding techniques, however, this polymer orientation is small so that there is little increase in the elastic coefficient, and the characteristics required of speaker vibration members can not be satisfied.

It is also well known that when heat is applied to thermoplastic (or thermotropic) liquid crystal polymers exhibiting a nematic phase in melting, they melt and their viscosity falls to exhibit excellent fluid flow properties. When these polymer fluids are molded into a mold adjusted at a lower temperature than the solidification temperature of the polymer and having the form of a thin speaker vibration member, the polymer cools and solidifies with orientation on the mold surface. Further, in the center layers in the direction of the member thickness, the polymer flow is a shear flow. It therefore flows under a large shear rate, orienting itself as it solidifies towards the center of the member so as to finally produce a sandwich structure. The surface orientation of the finished product obtained depends largely on the flow rate and the temperature of the mold. The orientation increases with higher flow rate and with lower temperatures of mold and polymer. Further, as the orientation in the center of the member depends on the shear rate, this orientation increases with higher flow rate and smaller thickness of the member. The present invention makes use of this principle.

FIG. 1A is a cross sectional view showing a mold including an inner mold and an outer mold.

FIG. 1B is a perspective view, with the outer mold having been removed, showing the resin flow in a mold where a speaker vibration member is manufactured according to one embodiment of the invention. 1 is an injection portion in, for example, the center of the mold, and 2 is a portion where the member is formed. The arrow A is the radial direction along the wall surface of the shaping portion, and arrow B is the circumferential direction of the shaping portion perpendicular to Arrow A. The mold is at a temperature sufficiently below that of the member materials such that the latter solidify as they flow. When these materials, containing no less than 10% by weight of liquid crystal polymer and 3 to 40% by weight of fiber or flake filler, are introduced into the mold in the molten state from injection portion 1, the polymer flow becomes a diverging flow, and a finished product largely oriented in direction A with a component in direction B can be obtained. In this invention, the mixing of fiber or flake fillers with the polymer has the effect of rendering the orientation of the polymer stable and uniform when it is molded. Vibration members obtained according to this invention therefore have a higher value of $E/\rho$ than those which contain no fillers. Further, due to the stability and uniformity of polymer orientation, the molding process itself is always stable.

The polymers used in this invention are liquid crystal polymers with the property of thermotropy. Examples are the copolymer of polyethylene terephthalate-p-hydroxybenzoic acid with polyethylene terephthalate, the copolyester prepared by melt polymerization of p-acetoxybenzoic acid, terephthalic acid and naphthalene-diacetate, or the polyester prepared from terephthalic acid, p-oxybenzoic acid and p,p'-biphenol. Moreover, other known or commercially available liquid crystal polymers showing the property of thermotropy can be used. The above thermoplastic liquid crystal polymers may constitute the entire. If they do not, they should however be incorporated to the extent of no less than 10% since in lesser proportions, the orientation of the polymer is incomplete and the effect of this invention will not be obtained. In other examples of the invention, a similar effect is obtained by blending these liquid crystal polymers with thermoplastic resins. There is no particular limitation on the thermoplastic resin, examples being polyethylene terephthalate, polybutylene terephthalate, polypropylene, polystyrene, polysulfone, polyphenylenesulfide, polyimide, polyamide, polycarbonate and polyethersulfone.

The fiber fillers used in this invention may be substances commonly used as resin fillers such as glass fiber, carbon fiber, wollastonite, talc, mica, glass flake or graphite. The filler proportion should preferably be 3 to 40% by weight; at proportions less than 3%, the effect of this invention is not obtained, while at proportions greater than 40%, (fluid) flow properties of the melt decline.

In addition, various additives which confer stability to light and heat may be added if necessary provided they do not adversely affect the composition of the invention.

The mold in the invention may be any of those commonly used for molding of thermoplastic resins without any particular limitation. Further, the polymer may be introduced into the mold by any method used for molding thermoplastic resins. An injection molding method should however be used such that the flow rate of the melt can be sufficiently controlled, and such that there is little deterioration of polymer in the molding process.

We shall now describe the invention in detail by means of the examples below, but it should be noted that these examples are not exhaustive.

Example 1

6 mm chopped strand carbon fiber was added to Vectra A950 (manufactured by Polyplastics Corp.), a polyester type liquid crystal polymer, to the extent of 40% by weight. The components were mixed together well in a tumbler, and extruded into pellets at 310° C. in an extruder (L/D=30) with a screw diameter of 30 mm. A speaker vibration member as described in Example 1 of this invention was then obtained by injection-molding the pellets using a metal mold of outer diameter 80 mm, inner diameter 40 mm and thickness 0.3 mm wherein the polymer could be injected from the center of the inner diameter, and an injection molding machine with a mold clamping force of 75 ton, with a resin temperature of 310° C., an injection pressure of 120 MPa, an injection time of 5 sec, a metal mold temperature of 110° C. and a cooling time of 30 sec. Table 1 shows the values of $E/\rho$ and tan $\delta$ (internal losses) as measured by the vibrating reed method on a test piece cut from the finished product. Similarly, the sound pressure-frequency characteristics of a speaker vibration member cut from the finished product are shown by the curve A in FIG. 2. In FIG. 2, the vertical axis is the response in decibels (dB), and the horizontal axis is the frequency in Hertz (Hz).

When the member was examined under a microscope, it was found to have a sandwich structure in the direction of the thickness comprising the surface layers containing well-oriented polymer and carbon fiber with a smooth surface, and the center layers containing well-oriented carbon fiber with fiber-like polymer which was also oriented. The surface layers are very thin, but the center layers are very thick in comparison with the former. Therefore, the improvements of $E/\rho$ and tan$\delta$ in the speaker vibration member depend largely on the orientation of the center layers.

Example 2

A composition was made by taking Vectra A950 containing 40% by weight of carbon fiber as prepared in Example 1, and mixing it with Vectra A950 in the ratio of 1:1 by weight. A speaker vibration member of this example was then obtained by molding the mixture with a resin temperature of 310° C., an injection pressure of 150 MPa, an injection time of 5 sec, a metal mold temperature of 110° C., and a cooling time of 30 sec. Table 1 shows the values of $E/\rho$ and tan $\delta$ (internal losses) measured by the vibrating reed method on a test piece cut from the finished product. The sound pressure-frequency characteristics of a vibration member cut from the finished product are shown by curve B in FIG. 2.

Example 3

A composition was made by taking Vectra A950 containing 40% by weight of carbon fiber as prepared in Example 1, and mixing it with Vectra A950 in the ratio of 1:7 by weight. A speaker vibration member of this example was then obtained by molding the mixture with a resin temperature of 310° C., an injection pressure of 150 MPa, an injection time of 5 sec, a metal mold temperature of 110° C., and a cooling time of 30 sec. Table 1 shows the values of $E/\rho$ and tan $\delta$ (internal losses) measured by the vibrating reed method on a test piece cut from the finished product. The sound pressure-frequency characteristics of a vibration member cut from the finished product are shown by curve C in FIG. 2.

Example 4

A composition was made by taking Vectra A950 containing 40% by weight of carbon fiber as prepared in Example 1, and mixing it with Vectra A950 and polybutylene terephthalate resin (NOVADUR 5010 CR, manufactured by Mitsubishi Kasei Kabushiki Kaisha), in the ratio of 10:8:2 by weight. A speaker vibration member of this example was then obtained by molding the mixture with a resin temperature of 310° C., an injection pressure of 150 MPa, an injection time of 5 sec, a metal mold temperature of 110° C., and a cooling time of 30 sec. Table 1 shows the values of $E/\rho$ and tan $\delta$ (internal losses) measured by the vibrating reed method on a test piece cut from the finished product. The sound pressure-frequency characteristics of a vibration member cut from the finished product are shown by curve D in FIG. 2.

Example 5

6 mm chopped strand glass fiber was added to Vectra A950, a polyester type liquid crystal polymer, to the extent of 20% by weight in the same way as in Example 1, and pellets were obtained by extrusion at 310° C. A speaker vibration member of this example was then obtained by molding these pellets with a resin temperature of 310° C., an injection pressure of 140 MPa, an injection time of 5 sec, a metal mold temperature of 120° C., and a cooling time of 30 sec. Table 1 shows the values of $E/\rho$ and tan $\delta$ (internal losses) measured by the vibrating reed method on a test piece cut from the finished product. The sound pressure-frequency characteristics of a vibration member cut from the finished product are shown by curve E in FIG. 2.

Comparative Example 1

6 mm chopped strand carbon fiber was added to BC03C (manufactured by Mitsubishi Yuka Kabushiki Kaisha), a polypropylene type resin, to the extent of 20% by weight in the same way as in Example 1, and pellets were obtained by extrusion at 210° C. A speaker vibration member of this invention was then obtained by molding these pellets with a resin temperature of 210° C., an injection pressure of 100 MPa, an injection time of 5 sec, a metal mold temperature of 80° C., and a cooling time of 30 sec. Table 1 shows the values of $E/\rho$ and tan $\delta$ (internal losses) measured by the vibrating reed method on a test piece cut from the finished product. The sound pressure-frequency characteristics of a vibration member cut from the finished product are shown by curve F in FIG. 2.

Comparative Example 2

NOVADUR 5010 G (manufactured by Mitsubishi Kasei Kabushiki Kaisha), a polybutylene terephthalate resin, was molded in the same way as in Example 1 with a resin temperature of 260° C., an injection pressure of 200 MPa, an injection time of 5 sec, a metal mold temperature of 120° C. and a cooling time of 30 sec. As the flow properties of the resin were inadequate, however, a satisfactory finished product was not obtained.

It can be seen from Table 1 and FIG. 2 that, due to the orientation of the liquid crystal polymer and the fiber filler material in the vibration member of the examples in this invention, the center layers of the member in the direction of the thickness have a high level of fiber-like orientation, while a smooth surface is formed on the surface layers by the cooled mold. This sandwich structure provides a member with a high elastic coefficient and suitable internal losses, thereby the member having characteristics of extended response in high frequency without much peaks and holes. In the above examples, the speaker vibration member is manufactured by melt molding. The materials of the invention may however also be melted and extruded into a sheet form and a vibration member may be manufactured from the sheet, for example, by vacuum-forming the sheet.

TABLE 1

| Vibration member | $E/\rho$ (cm$^2$/s$^2$) | tan$\delta$ |
| --- | --- | --- |
| Example 1 | 15.2 × 10$^{10}$ | 0.055 |
| Example 2 | 12.2 × 10$^{10}$ | 0.06 |
| Example 3 | 10.6 × 10$^{10}$ | 0.06 |
| Example 4 | 10.2 × 10$^{10}$ | 0.06 |
| Example 5 | 12.6 × 10$^{10}$ | 0.05 |
| Comparative Example 1 | 5.4 × 10$^{10}$ | 0.06 |

In this invention, carbon graphite may be used as a filler. When the graphite is first mixed into the polymer, it is subjected to a strong shear stress, the surface layers of graphite particles peel, and a fresh, active surface of graphite is exposed. This graphite is uniformly dispersed in the liquid crystal polymer and worked in carefully so that the graphite crystals become thin flakes, and give a clear orientation to the polymer in the direction of the surface (plane). The result is that along the surface, the rigidity of the graphite is uniform in every direction, a uniform, high elastic coefficient is obtained in the circumferential and radial directions, and high internal losses are obtained due to the graphite slipping and the combination by liquid crystal polymer in the direction perpendicular to the surface. In comparison to speaker vibration members which do not contain carbon graphite, the members obtained in these examples are characterized by high elastic coefficients and high internal losses.

Example 6

A composition was made by mixing Vectra A950, a polyester type liquid crystal polymer, with Vectra A625 (which is Vectra A950 containing 25% carbon graphite by weight), in the proportion of 1 : 4 by weight. A speaker vibration member of this example was then obtained by molding the mixture with a resin temperature of 310° C., an injection pressure of 150 MPa, an injection time of 5 sec, a metal mold temperature of 110° C., and a cooling time of 30 sec. Table 2 shows the values of $E/\rho$ and internal losses measured by the vibrating reed method on a test piece cut from the finished product. The sound pressure-frequency characteristics of a vibration member cut from the finished product are shown by curve A in FIG. 3. In FIG. 3, the vertical axis is sound pressure expressed in decibels (dB), while the holizontal axis is the frequency in Hertz (Hz).

Example 7

A speaker vibration member of this example was obtained by taking Vectra 625, consisting of a polyester type liquid crystal polymer with 25% carbon graphite by weight, and molding it with a resin temperature of 310° C., an injection pressure of 150 MPa, an injection time of 5 sec, a metal mold temperature of 110° C., and a cooling time of 30 sec. Table 2 shows the values of $E/\rho$ and internal losses measured by the vibrating reed method on a test piece cut from the finished product. The sound pressure-frequency characteristics of a vibration member cut from the finished product are shown by curve B in FIG. 3.

Comparative Example 3

BC03C (Mitsubishi Yuka Kabushiki Kaisha), a polypropylene resin, was molded in the same way as in Example 6 with a resin temperature of 220° C., an injection pressure of 100 MPa, an injection time of 5 sec, a metal mold temperature of 80° C. and a cooling time of 30 sec. Table 2 shows the values of $E/\rho$ and internal losses measured by the vibrating reed method on a test piece cut from the finished product. The sound pressure-frequency characteristics of a vibration member cut from the finished product are shown by curve C in FIG. 3.

It will be appreciated from Table 2 and FIG. 3 that, due to the orientation of liquid crystal polymer and carbon graphite, the vibration members according to these examples have a uniform, high elastic coefficient, high internal losses, extended response in high frequency, and not much peaks and holes.

If the amount of carbon graphite is excessive, however, internal losses become smaller, and the molding process also becomes difficult. The proportion of carbon graphite should therefore be within the range 3 to 40%, and preferably 5 to 25%.

This invention can also be applied to the center cap as a part of the vibration member.

TABLE 2

| Vibration Members | $E/\rho$ (cm$^2$/s$^2$) | Internal Losses |
| --- | --- | --- |
| Example 1 | $9.8 \times 10^{10}$ | 0.07 |
| Example 2 | $7.3 \times 10^{10}$ | 0.09 |
| Comparative Example 1 | $3.2 \times 10^{10}$ | 0.06 |

What is claimed is:

1. A method for manufacturing a speaker vibration member in a molding process, said method comprising:
    a first step of preparing a mixture of materials for forming said speaker member, said mixture of materials containing no less than 10% by weight of liquid crystal polymer and 3 to 40% by weight of fiber or flake filler,
    a second step of melting the mixture of liquid crystal polymer and fiber or flake filler materials,
    a third step of introducing the mixture into a mold, said mold being maintained at a lower temperature than a solidified temperature of said mixture of materials, and
    a fourth step of cooling and solidifying the melted mixture materials as the mixture flows in said mold which is adjusted at said lower temperature than the solidification temperature of the materials so that orientation of the mixture materials in the center layers of said molded speaker vibration member is increased for increasing the elasticity coefficient of said vibration member by increasing the shear flow rate and decreasing the mold temperature.

2. A method as described in claim 1, wherein said filler consists of at least one of glass fiber, carbon fiber, wollastonite, talc, mica, and glass flakes.

3. A method as described in claim 1, wherein said filler is carbon graphite flake.

4. A method as described in claim 3, wherein carbon graphite is present to the extent of 5 to 25% by weight.

5. A method as described in claim 1, wherein said mixture materials contain a thermoplastic liquid crystal polymer, a flake filler, and a thermoplastic resin.

6. A method as described in claim 1, wherein said mixture materials are molded into the speaker vibration member by injection molding.

7. A method as described in claim 6, wherein said mixture materials are injected from the center of the mold.

* * * * *